(12) United States Patent
Dorenbosch

(10) Patent No.: US 6,895,254 B2
(45) Date of Patent: May 17, 2005

(54) METHOD AND APPARATUS FOR PROVIDING A DISPATCH CALL

(75) Inventor: Jheroen P. Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 312 days.

(21) Appl. No.: 10/122,779

(22) Filed: Apr. 15, 2002

(65) Prior Publication Data

US 2004/0203793 A1 Oct. 14, 2004

(51) Int. Cl.[7] .................................. H04K 3/00
(52) U.S. Cl. ..................... 455/518; 455/519
(58) Field of Search ............... 455/518, 519, 455/90.2, 181.1, 231, 463, 464, 515, 516, 416, 417, 415, 426.1, 520, 524, 507, 560

(56) References Cited

U.S. PATENT DOCUMENTS

| | | | |
|---|---|---|---|
| 5,850,611 A | * | 12/1998 | Krebs .......................... 455/518 |
| 5,960,362 A | | 9/1999 | Grob et al. |
| 6,298,058 B1 | | 10/2001 | Maher et al. |
| 6,317,607 B1 | | 11/2001 | Tomcik et al. |
| 6,714,795 B1 | * | 3/2004 | Long et al. .................. 455/518 |
| 2002/0119792 A1 | * | 8/2002 | Silvestri ...................... 455/463 |

FOREIGN PATENT DOCUMENTS

| | | |
|---|---|---|
| EP | 1 182 895 A1 | 2/2002 |
| WO | WO 93/26102 A1 | 12/1993 |
| WO | WO 95/23475 A2 | 8/1995 |
| WO | WO 01/67674 A2 | 9/2001 |
| WO | WO 01/86975 A2 | 11/2001 |

* cited by examiner

Primary Examiner—Nay Maung
Assistant Examiner—Tu X Nguyen

(57) ABSTRACT

In addition to a hang timer (405), a second timer (403) (session timer) is introduced. A base station (101, 102) monitors a dispatch call, and if there exists no activity for a period of time greater than the hang-timer threshold, the base station (101, 102) will drop the over-the-air channels broadcasting the call to the remote units (113–118). All active participants to the call will be maintained until the session timer expires. Once the session timer expires, the talk-group participants will be reset to their original members.

6 Claims, 6 Drawing Sheets

METHOD AND APPARATUS FOR PROVIDING A DISPATCH CALL

FIELD OF THE INVENTION

The present invention relates generally to providing a dispatch call, and in particular, to a method and apparatus for providing a dispatch call within a communication system.

BACKGROUND OF THE INVENTION

Unlike standard interconnect services provided by today's cellular systems, a dispatch group call service enables a user to communicate with a group of people simultaneously and instantaneously, usually by depressing a push-to-talk (PTT) button. Using a cellular communication system's standard interconnect services would not allow such a call to occur instantaneously since either a telephone number would need to be dialed for a three-way call or arrangements would need to be made to setup a conference call.

Likewise, the dispatch service enables a user to communicate with another user quickly and spontaneously. This feature is ideal for two people who are working together but are unable to speak with one another directly such as two people working in concert but in different parts of a building. Where a wireless telephone call is more appropriate for a conversation, short messages between two people as they work are better facilitated by the dispatch call service.

During a typical dispatch call, over-the-air channels assigned to the call are maintained until an inactivity timer (hang timer) has expired. In particular, a base station monitors the dispatch call, and if there exists no activity for a period of time, the base station, in collaboration with other infrastructure elements, will drop the over-the-air channels broadcasting the call to the remote units. If activity resumes, the base station will then reassign channels to the conversation, and again monitor for inactivity.

One feature provided to dispatch call participants is the ability to opt-out of a dispatch call. For example, a particular user may be a member of a group, yet have no interest in participating in a particular group call (e.g., the user is in a meeting, Church, . . . , etc. and does not want to be bothered). In this situation, the user may instruct the communication system that it does not wish to participate in the call. The communication system will then drop the channel providing the call to the remote unit and the user will no longer participate in the particular group call. During subsequent group calls (at later times), the user will again be pulled into the call.

Although the above procedure allows a user to leave a particular call and remain a participant in subsequent calls, a problem can arise when the hang timer is allowed to expire and the current call continues after such. In such situations, a different call is set up having the original participants. A user that has chosen to leave the original group call will again be pulled into the call, and must again chose to leave the call. Therefore, a need exists for a method and apparatus for providing a dispatch call within a communication system that reduces the chances that a user will be pulled back into a call that they have chosen to leave.

DETAILED DESCRIPTION OF THE DRAWINGS

Figure 1:
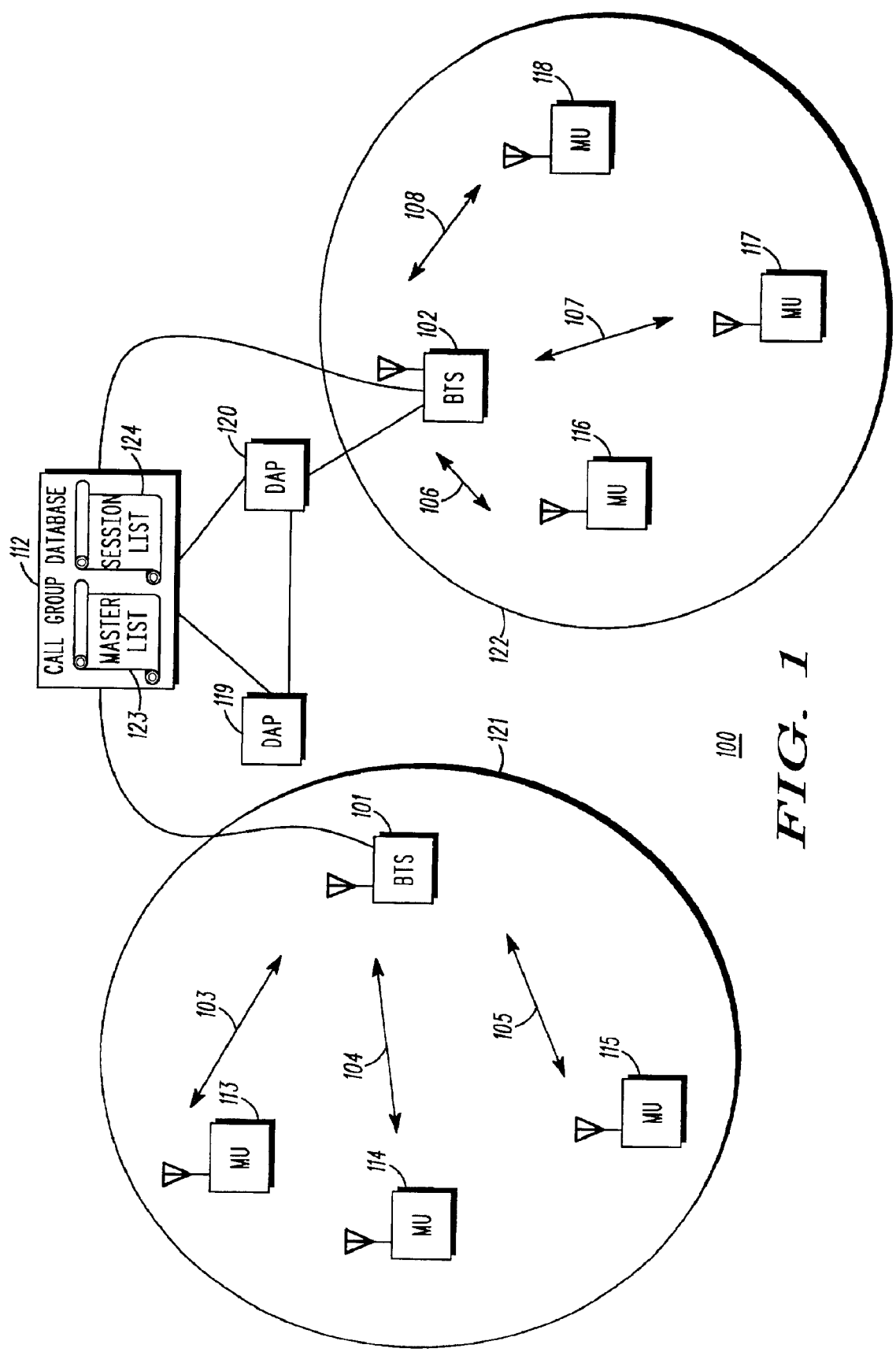
FIG. 1 is a block diagram of a communication system in accordance with the preferred embodiment of the present invention.

To address the above-mentioned need, a method and apparatus for providing a dispatch call is provided herein. In accordance with the preferred embodiment of the present invention, a second (session) timer is introduced in addition to the first (hang) timer. A base station monitors a dispatch call, and if there exists no activity for a period of time greater than the hang-timer threshold, the base station will drop the over-the-air channels broadcasting the call to the remote units. However, all active participants to the call will be maintained until the session timer expires. Once the session timer expires, the talk-group participants will be reset to their original members.

Because the session timer holds the associated book keeping (i.e., the modified group call participants) for a time greater than the hang timer, the call channels can be dropped without dropping the associated session members. This greatly reduces the chances that a user, who has opted out of a call, will again become a participant in the call. Additionally, because the user is again added to the call group after the session timer has expired, the user will be involved in future calls for the group.

The present invention encompasses an apparatus for providing a dispatch call. The apparatus comprises a controller coupled to a first and a second timer wherein the first timer causes a channel to be dropped after a first threshold and the second timer causes participants to the dispatch call to be reset after a second threshold.

The present invention additionally encompasses a method for providing a dispatch call. The method comprises the steps of providing the dispatch call to a first plurality of remote units, and receiving an option message from a remote unit, wherein the option message comprises instructions to exclude or include the remote unit in the dispatch call. The dispatch call is provided to a second plurality of remote units in response to the option message and all over-the air channels to the dispatch call are dropped. After dropping the channels, a request is received to again provide the dispatch call and in response to the request, the dispatch call is again provided to the second plurality of remote units.

The present invention additionally encompasses a method for providing a dispatch call within a communication system. The method comprises the steps of providing the dispatch call to a first plurality of remote units, receiving an option message, wherein the option message comprises instructions to exclude or include a remote unit in the dispatch call, providing the dispatch call to a second plurality of remote units in response to the option message, and determining that a first timer has expired. Once it has been determined that the first timer has expired all over-the-air channels are dropped. When a request is received to provide the dispatch call it is determined if a second timer has expired and the dispatch call is provided to the first plurality of remote units if the second timer has expired, otherwise providing the dispatch call to the second plurality of remote units.

The present invention additionally encompasses a method for providing a dispatch call. The method comprises the steps of receiving a request to provide the dispatch call, receiving a first list of call participants, providing the dispatch call to members of the first list of call participants, receiving a message from a remote unit, wherein the message is a request by the remote unit to either opt in, or opt out of the dispatch call, in response to the request, modifying the first list to create a second list of call participants, providing the dispatch call to members of the second list of call participants, detecting inactivity in the dispatch call, dropping over-the-air channels in response to the inactivity, receiving request to again provide the dispatch call, and again providing the dispatch call to members of the second list of call participants.

Finally, the present invention encompasses a database comprising a master list containing a first set of group-call participants for a group-call identification and a session list containing a second set of group-call participants for the group-call identification.

Turning now to the drawings, wherein like numerals designate like components, FIG. 1 is a block diagram of communication system 100 in accordance with the preferred embodiment of the present invention. In the preferred embodiment of the present invention, communication system 100 utilizes the Motorola Inc. iDEN system protocol, but in alternate embodiments communication system 100 may utilize other analog or digital cellular communication system protocols capable of supporting group call operation. Such protocols include, but are not limited to, the next generation Global System for Mobile Communications (GSM) protocol, or the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008).

Communication system 100 includes group-call database 112 coupled to Radio Access Networks (RANs) 121–122. Each RAN 121–122 comprises a plurality of remote, or mobile units (MUs) 113–118, at least one Base Transceiver Station (BTS) 101–102, and at least one Dispatch Application Processor (DAP) 119–120. Although not shown, RANs 121–122 additionally include well known network elements such as Mobile Switching Centers (MSCs), Centralized Base Station Controllers (CBSCs) in a circuit switch network, or such as Multiple Control Unit (MCUs) in a CDMA system, and Radio Network Controller (RNCs), Gatekeepers (GKs) and GateWays (GWs) in a packet switch network. It is contemplated that network elements within communication system 100 are configured in well known manners with processors, memories, instruction sets, and the like, which function in any suitable manner to perform the function set forth herein.

As shown, base stations 101–102 are capable of communicating with remote units 113–118 via over-the-air channels 103–108, respectively. Each over-the-air channel 103–108 preferably comprises a unique frequency/timeslot (or code in a CDMA system), however, in alternate embodiments (e.g., multicast scenarios) channels 103–108 may be shared among remote units 113–118. In the preferred embodiment of the present invention base stations 101–102 are capable of providing dispatch services to remote units 113–118 over channels 103–108. When providing dispatch services, communication system 100 maintains in its group-call database, master list 123 containing information on which remote units 113–118 belong to which groups. This information typically is stored in a persistent way. To enable the preferred embodiment of the present invention, the communication system 100 also maintains in its group-call database, a session list 124 to keep track of the actual participants each group call in progress. A session list can be stored in volatile memory, which allows for an economical implementation.

When a remote unit initially presses the push-to-talk button, a PTT_on message is sent to the serving base station, causing a set of resources to be allocated. When the remote unit releases the push-to-talk button, the remote unit sends a PTT_off indication to the base station the resources remain dedicated to the remote unit for some period of time (hang time, e.g., 12 seconds). During the time when the user is not depressing the push-to-talk button, the base station transceiver subsystems send idle frames to preserve the link power control. In this way, when the remote unit user subsequently depresses the push-to-talk button, the link is completely established and immediately responsive. This type of operation accommodates the natural use of a dispatch system.

The hang timer is used to detect the end of a call. When no remote user depresses the push-to talk button before the hang timer expires, the infrastructure considers the call terminated, and releases the resources for use in other calls. When occasionally a remote user depresses the push-to talk button after the hang timer expires, the infrastructure sets up a new call, allocating a new set of resources. For efficient use of resources, a shorter hang timer value should be used. The preferred embodiment of the present invention enables the use of very short hang timer values (e.g., 4 seconds), while alleviating the problem of rejoining remote units to a particular call they opted out of.

Figure 2:
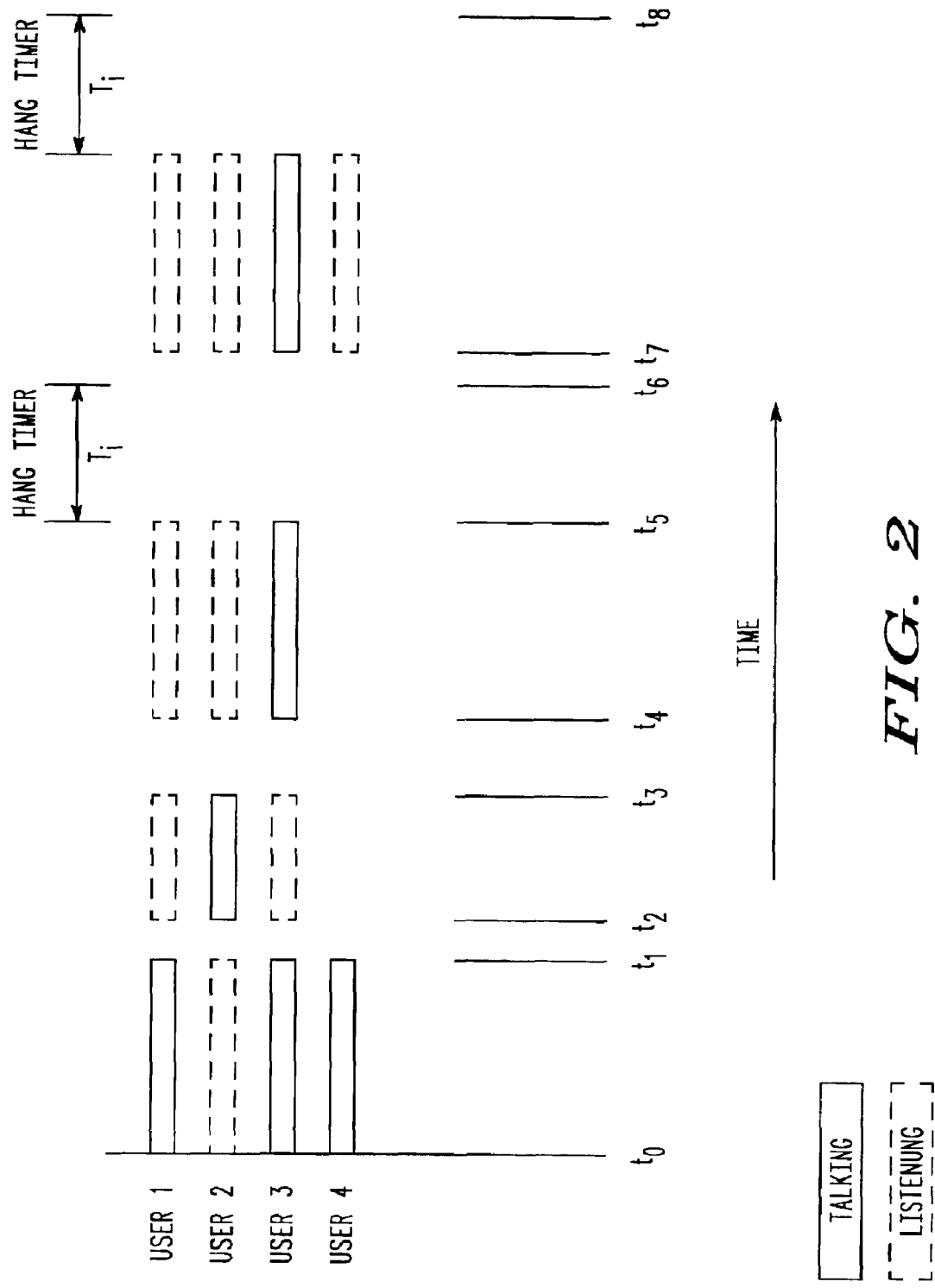
FIG. 2 illustrates a prior-art dispatch call.

FIG. 2 illustrates a prior-art dispatch call. As shown, there exists four users that originally participate in the call (User 1, . . . , User 4). At time $t_0$ User 1 initiates the group call by depressing a PTT button, causing the appropriate resources to be allocated to allow group dispatch calling between the users. As shown, the dispatch call begins with User 1 actively talking to other members of the group. At time $t_1$ User 1 ceases talking. Also, at this time, User 4 opts out of the call by notifying his serving base station using an option message, causing the downlink channel to be dropped. It should be noted that in the preferred embodiment of the present invention the option message allows a remote unit to be included or excluded in the dispatch call. For example, any remote unit currently in the call and wishing to leave the call will send an option message "opting out" of the call, while any remote unit, not currently part of the dispatch call, can send an option message "opting in" the call.

Continuing, at time $t_2$, User 2 begins talking and ends talking at time $t_3$. As discussed above, during periods of inactivity, an inactivity timer is initiated, however, because the period of inactivity (i.e., $t_2-t_1$) was not greater than the inactivity timer threshold ($T_h$), all currently-active downlink channels are maintained by the system. User 3 begins talking at time $t_4$. Again, because the period of inactivity (i.e., $t_4-t_3$) is not greater than $T_h$, all active downlink channels are maintained by the system. At time $t_5$ User 3 stops talking, and at time $t_6$ the inactivity timer expires (i.e., $t_7-t_5>T_h$), causing all channels to be dropped by the system. However, after the inactivity timer has expired, User 3 again begins to talk (at time $t_7$), causing the system to again allocate resources to all members of the group. This causes User 4 to again become a participant in the conversation.

In order to solve this problem, in the preferred embodiment of the present invention a second timer (session timer) is introduced in addition to the hang timer. In addition to the second timer, a second bookkeeping is done for the call membership (session participant list) in addition to keeping track of the original group membership. In the preferred embodiment of the present invention the session timer causes changes to a group call to be maintained until the session timer has expired.

Figure 3:
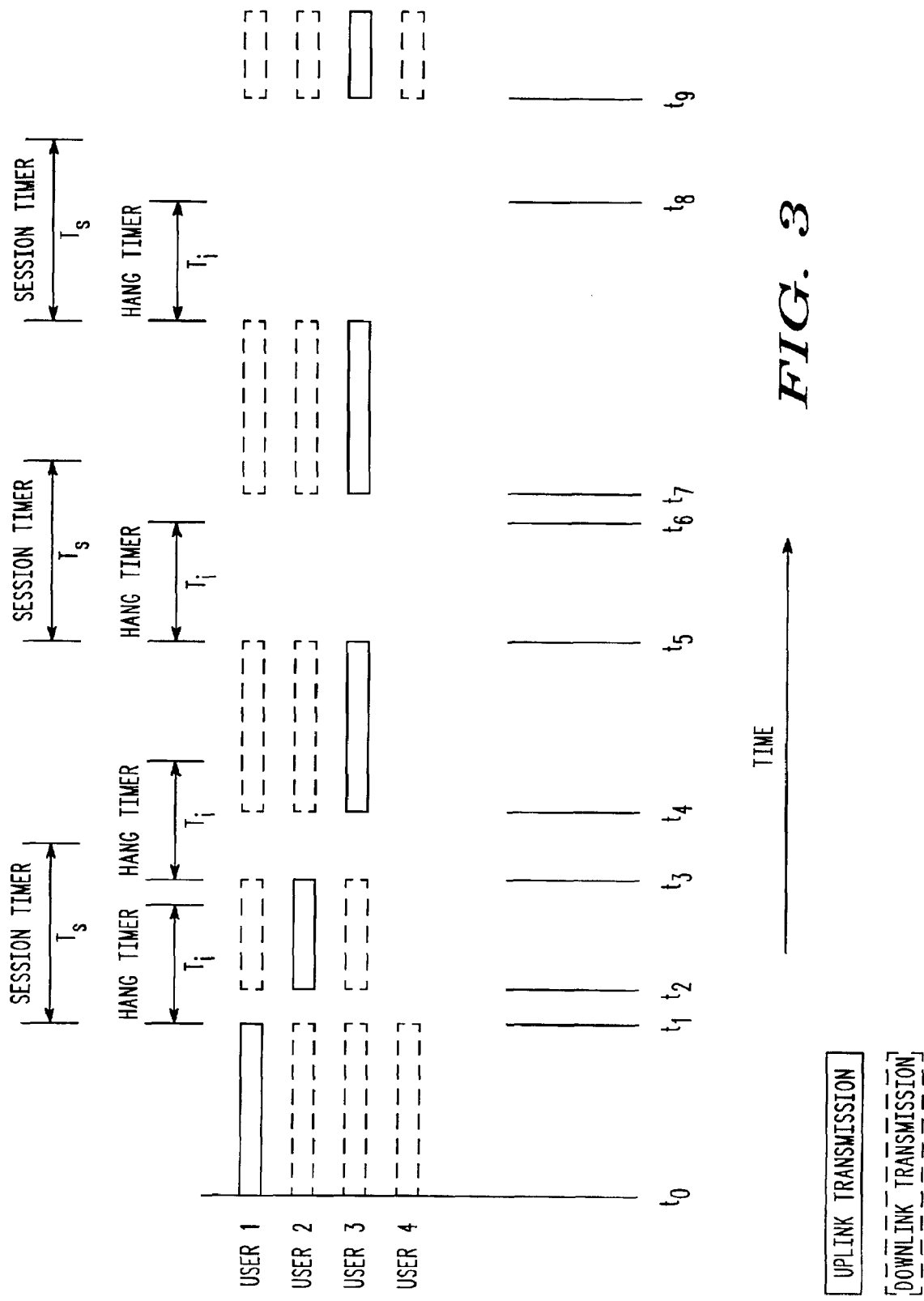
FIG. 3 illustrates a dispatch call in accordance with the preferred embodiment of the present invention.

FIG. 3 illustrates a group call in accordance with the preferred embodiment of the present invention. As shown, there exists four users that originally participate in the call (User 1, . . . , User 4). These original participants are entered into a session participant list 124. At time $t_0$ User 1 initiates the group call by depressing a PTT button, causing the appropriate resources to be allocated to allow group dispatch calling between the users. As shown, the dispatch call begins with User 1 actively talking to other members of the group. At time $t_1$ User 1 ceases talking. Also, at this time, User 4 opts out of the call by notifying his serving base station using an option message, causing the downlink channel to be dropped. At this time, User 4 for remains a member of the group, but is removed from the session participant list.

Continuing, at time $t_2$, User 2 begins talking, and finishes talking at time $t_3$. Because the period of inactivity (i.e., $t_2$–$t_1$) is not greater than the inactivity timer threshold ($T_h$), all active downlink channels are maintained by the system. User 3 begins talking at time $t_4$ Again, because the period of inactivity (i.e., $t_4$–$t_3$) is not greater than the inactivity timer, all active downlink channels are maintained by the system. At time $t_5$ User 3 stops talking, and at time $t_6$ the inactivity timer expires. As in prior art systems, the expiration of the inactivity, or hang timer, causes all channels to be dropped by the system. However, unlike prior-art systems, User 4 is not added to subsequent group calls unless the group call is made after expiration of the session timer (i.e., after $T_s$). Therefore, when User 3 again begins to talk (at $t_7$), only participants from the session participant list are included in the call, and User 4 does not become a participant in the conversation. Thus, in the preferred embodiment of the present invention when there exists no activity for a first period of time, all active channels are dropped with the group session participants being maintained, and when there exists no activity for a second period of time (e.g., 40 seconds) the group-call participants are reset to their original configuration. This is illustrated at time $t_9$ where User 3 places a group call to the participants. At this time, because $t_2$–$t_1$>$T_s$, the session timer has expired, causing User 4 to again be added to the call. In the preferred embodiment of the present invention, the second period of time used for the session timer is chosen to be much longer than the hang time. This, for example, gives a participant sufficient time to lay down the phone during the group call, to look up some information on a computer and to connect back to the original group call.

Because the session timer holds the associated book keeping (i.e., the modified group call participants) for a time greater than the hang timer, the call channels can be dropped without dropping the associated session members. This greatly reduces the chances that a user, who has opted out of a call, will again become a participant in the call. Additionally, because the user is again added to the call group after the session timer has expired, the user will be involved in future calls for the group.

Figure 4:
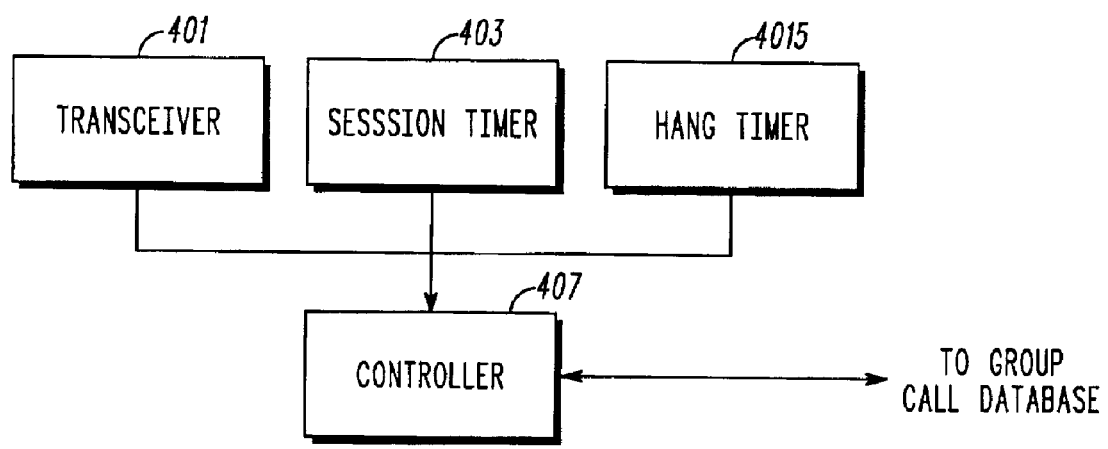
FIG. 4 is a block diagram of a base station in accordance with the preferred embodiment of the present invention.

FIG. 4 is a block diagram of a base station in accordance with the preferred embodiment of the present invention. As shown, the base station (e.g., base station 101) comprises transceiver 401, session timer 403, hang timer 405, and controller 407. As known in the art, when a remote unit (e.g., remote unit 113) initiates a dispatch connection, a series of transactions must take place to allocate resources. For example to initiate a connection, a remote unit sends an origination message on an access channel comprising a PTT_on message indicating that the push-to-talk button has been depressed, along with an identification of a talk group. Controller 407 accesses group-database 112, provides database 112 with a talk-group identification, and is supplied a list of users in communication with base station 101. Controller then establishes a downlink channel to all remote units in communication with base station 101.

As discussed above, during a call, a remote unit (e.g., remote unit 114) may desire to no longer participate in the call. If this is the case, controller 407 may receive an option message, indicating that remote unit 114 no longer desires to participate in the dispatch call. When such messages are received, controller 407 accesses group-call database 112 and provides database 112 with the option message, causing database 112 to temporarily modify the talk group, removing remote unit 114. Controller 407 will additionally drop the channel between base station 101 and remote unit 114.

As discussed above, during the group call, controller 407 will activate session timer 403 and hang timer 405 whenever transmission to/from remote unit 113 ceases. If there exists no transmission to/from remote unit 113 for a time greater than the hang-time threshold ($T_h$), then controller 407 will drop all channels for those remote units participating in the call. Similarly, if there exists no transmission to/from remote unit 113 for a time greater than the session-time threshold ($T_s$), then controller 407 will notify group-call database 112, causing database 112 to "reset" the talk group to its original participants (by deleting the session participant list).

Operating communication system 100 as such allows the call channels to be dropped without dropping the associated group members. For example, once the channels are dropped, further communication to the talk group will cause the original series of transactions to take place in order to allocate the necessary resources, including the accessing of database 112. As discussed above, database 112 provides base station 101 with a list of call participants associated with the talk group, however, unlike the original call establishment, unless the session timer has expired, remote unit 114 will not be included as a member of the group.

Figure 5:
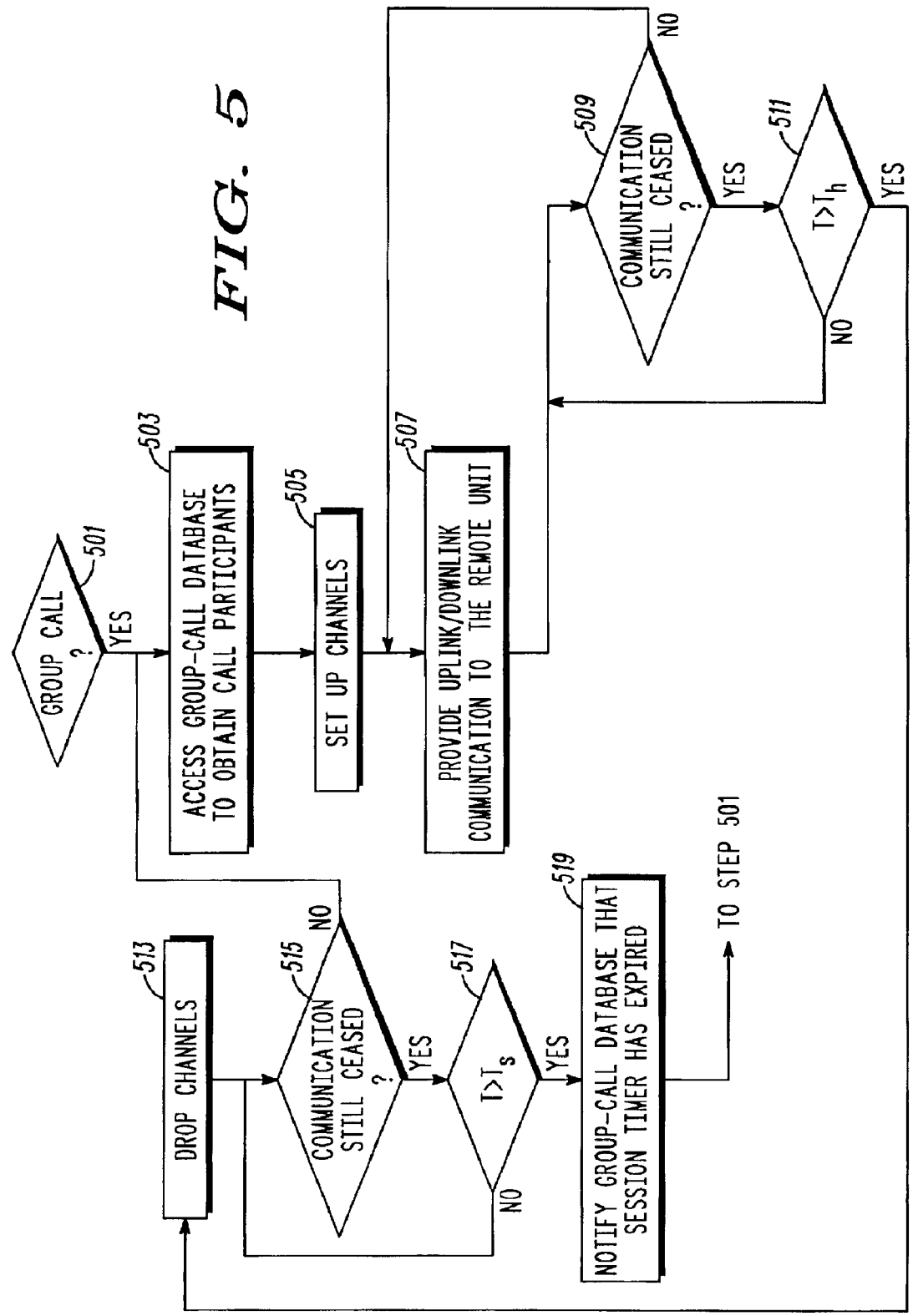
FIG. 5 is a flow chart showing operation of the base station of FIG. 4 in accordance with the preferred embodiment of the present invention.

FIG. 5 is a flow chart showing operation of the base station of FIG. 4 in accordance with the preferred embodiment of the present invention. The logic flow begins at step 501 where controller 407 determines if a group call needs to be initiated, and if so, the logic flow continues to step 503. At step 503 controller 407 accesses group call database 112 to obtain call participants. Uplink/Downlink channels are then established with the call participants (step 505) and all uplink/downlink communication is provided to the remote unit (step 507). In particular, uplink/downlink communication is continuously supplied to the remote units involved in a call, unless the remote units opt out of the call. As discussed above, if an option message is received, the base station provides this message to database 112, where the call participants are appropriately updated. The dispatch call is then provided to the updated members of the group call.

Continuing, controller 407 continuously monitors the call to determine if inactivity exists (step 509). If at step 509, communication ceases then controller 407 determines if inactivity has existed for greater than $T_h$ (step 511), and if not, the logic flow returns to step 507. If, however inactivity has existed for greater than $T_h$, the logic flow continues to step 513 where all channels associated with the group call are dropped.

Once all channels have been dropped, group-call database 112 still maintains updated group participant information in session list 124. Therefore, if the channel is re-established at this point, accessing group-call database will provide the base station with call members that have not opted out of the call and the base station will again provide the dispatch call to the updated members of the group. With this in mind, at step 505 controller 407 determines if communication for the group call has still ceased, and if not, the logic flow returns to step 503 where the group-call database is accessed.

However, if at step 515 it is determined that communication has still ceased, the logic flow continues to step 517 where it is determined if $T>T_s$. If $T>T_s$, the session timer has expired, and group-call database 112 is notified (step 519), causing database 112 to reset the talk-group participants to the original members. The logic flow returns to step 501. Thus in accordance with the preferred embodiment of the present invention the dispatch call is provided to a first plurality of remote units if the session timer has expired, otherwise the dispatch call is provided to a second plurality of remote units.

Figure 6:
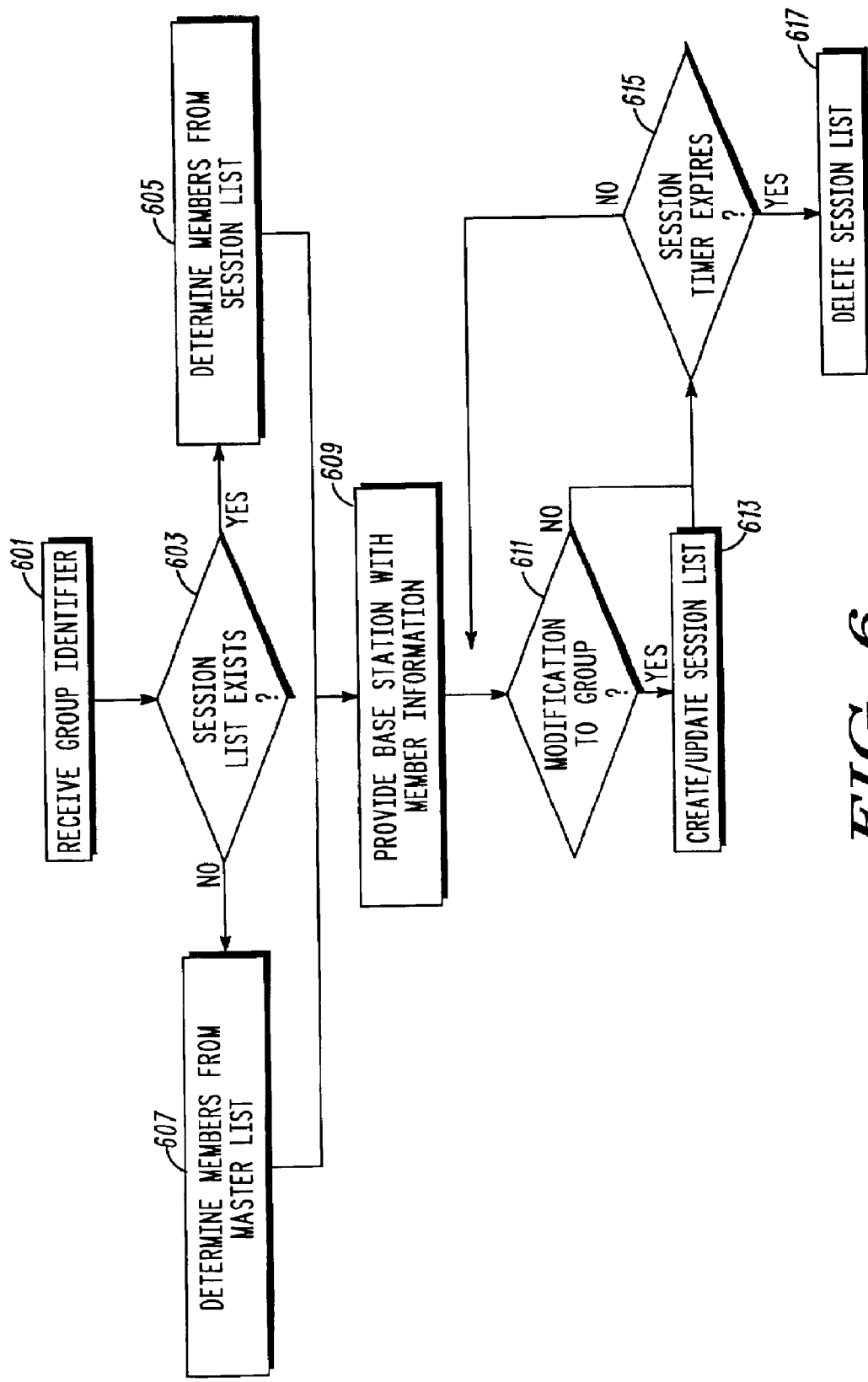
FIG. 6 is a flow chart showing operation of the group call database in FIG. 1 in accordance with the preferred embodiment of the present invention.

FIG. 6 is a flow chart showing operation of the group call database in FIG. 1 in accordance with the preferred embodiment of the present invention. The logic flow begins at step 601 where database 112 receives a group identifier from a base station. When received, database 112 immediately determines if session list 124 exists (step 603) and if so, the group members are determined from session list 124 (step 605), otherwise the group members are determined from master list 123 (step 607). As discussed above, master list 123 contains a first set of group-call participants based on a group call identification while the session list contains a second set of group-call participants for the same group call identification, only the session list does not contain members that have chosen to opt out of the group call. Thus, the second set of set of group-call participants is a subset of the first set of group-call participants.

Once determined, database 112 provides base stations serving the members of the call with member information (step 609). During the call, database 112 continuously monitors for any changes or modification to the group. As discussed above, when a user opts out of a call, database 112 is provided with the opt-out information in an option message from the user's serving base station. With this in mind, at step 611, database 112 continuously monitors if any changes to the group have been made and if not, the logic flow continues to step 615, otherwise at step 613 session list 124 is either updated (if it exists) or created (if it does not exist). The logic flow continues to step 615. At step 615 it is determined if the session timer has expired. As discussed above, when a session timer expires, the base station will provide such notification to database 112. If this occurs, then session list 124 is deleted (step 617), otherwise the logic flow returns to step 611.

While the invention has been particularly shown and described with reference to a particular embodiment, it will be understood by those skilled in the art that various changes in form and details may be made therein without departing from the spirit and scope of the invention. For example, it should be noted that the session participant list can be modified during a call by the addition of a new session participants. New session participants can be added when they are pulled into the conversation by a current session participant, for example by calling the new participant with an opt-in request. New session participants can also be allowed to add themselves by selecting to call into the group session with an opt-in request. Database 112 is notified of the addition of an additional participant information by a base station using an option message, where the option message contains opt_in information for the additional participant. The new participant is added to the session participant list and only the participants in that list are included in the call (as described above). Additionally, it is contemplated that when a participant reconnects to the group while a session is in progress, the participant is treated like a new participant, except that the reconnecting remote unit is not added to the session participant list because the remote unit is already included. It is intended that such changes come within the scope of the following claims.

What is claimed is:

1. An apparatus that facilitates dispatch calls between remote units, the apparatus comprising:
   a hang timer configured to expire upon reaching a first time threshold that corresponds to inactivity during the dispatch call; and
   a session timer configured to expire upon reaching a second time threshold, which is longer in duration than first time threshold, and likewise corresponds to inactivity during the dispatch call; and
   a controller, coupled to the hang timer and the session timer, and configured to:
   link a first plurality of the remote units,
   link a second plurality of the remote units by dropping or adding an over-the-air channel for at least one designated remote unit,
   activate the hang timer and session timer when transmissions between the remote units cease,
   drop all the over-the-air channels for the remote units upon expiration of the hang timer,
   upon receipt of a dispatch call request from one among the second plurality of remote units, link the first plurality of the remote units if the session timer has expired, or link the second plurality of the remote units if the session timer has not expired.

2. A method of providing a dispatch call within a communication system, the method comprising the steps of:
   providing the dispatch call to a first plurality of remote units;
   receiving an option message, wherein the option message comprises instructions to exclude or include a remote unit the dispatch call;
   providing the dispatch call to a second plurality of remote units in response to the option message;
   activating a hang timer and a session timer when transmissions between the remote units cease, the hang timer being configured to expire upon reaching a first time threshold, and the session timer being configured to expire upon reaching a second time threshold that is longer in duration than the first time threshold;
   dropping all over-the-air channels in response to expiration of the hang timer;
   receiving a request to provide the dispatch call from one among the second plurality of remote units; and
   providing the dispatch call to the first plurality of remote units if the session timer has expired, otherwise providing the dispatch call to the second plurality of remote units.

3. The method of claim 2 wherein the step of providing the dispatch call to the first plurality of remote units comprises the step of providing the dispatch call the first plurality of remote units, wherein the call is provided in an iDEN communication system.

4. The method of claim 2 wherein the step of providing the dispatch call to the first plurality of remote units comprises the step of providing the dispatch call to the first plurality of remote units, wherein the call is provided in a CDMA communications system.

5. The apparatus of claim 1, wherein the first threshold is substantially equal to 4 seconds.

6. The apparatus of claim 1, wherein the second threshold is substantially equal to 40 seconds.

* * * * *